United States Patent [19]

Bastioli et al.

[11] Patent Number: 5,288,765
[45] Date of Patent: Feb. 22, 1994

[54] EXPANDED ARTICLES OF BIODEGRADABLE PLASTICS MATERIALS AND A METHOD FOR THEIR PRODUCTION

[75] Inventors: Catia Bastioli, Novara; Vittorio Bellotti, Fontaneto D'Agogna; Luciano Del Giudice, Milan; Roberto Lombi; Angelos Rallis, both of Novara, all of Italy

[73] Assignee: Spherilene S.r.l., Milan, Italy

[21] Appl. No.: 972,875

[22] Filed: Nov. 4, 1992

Related U.S. Application Data

[63] Continuation of Ser. No. 663,823, Mar. 27, 1991, abandoned.

[30] Foreign Application Priority Data

Aug. 3, 1989 [IT] Italy .............................. 67667 A/89

[51] Int. Cl.$^5$ ......................... C08J 9/18; C08L 3/06
[52] U.S. Cl. .................................. 521/84.1; 524/47; 524/52; 524/53; 106/210; 106/211; 106/212; 106/213; 106/214
[58] Field of Search ............... 521/84.1; 524/47, 52, 524/53; 106/210, 211, 212, 213, 214

[56] References Cited

U.S. PATENT DOCUMENTS

| | | | |
|---|---|---|---|
| 2,788,546 | 4/1957 | Mellier et al. | 106/210 |
| 3,116,351 | 12/1963 | Wohlrabe et al. | 264/186 |
| 3,117,014 | 1/1964 | Klug | 106/213 |
| 3,137,592 | 6/1964 | Protzman et al. | 106/210 |
| 3,243,308 | 3/1966 | Barger et al. | 106/213 |
| 3,265,509 | 8/1966 | Wurzburg et al. | 426/660 |
| 3,265,510 | 8/1966 | Wurzburg et al. | 426/516 |
| 3,336,429 | 8/1967 | Carevie | 106/213 |
| 3,407,070 | 10/1968 | Murray et al. | 426/559 |
| 3,652,542 | 3/1972 | Hjermstad | 260/233.3 R |
| 3,891,624 | 6/1975 | Boonstra et al. | 536/111 |
| 3,954,104 | 5/1976 | Kraskin et al. | 229/3.5 R |
| 3,962,155 | 6/1976 | Usamato et al. | 521/84.1 |
| 4,026,986 | 5/1977 | Christen et al. | 264/301 |
| 4,076,846 | 2/1978 | Nakatsuka et al. | 426/62 |
| 4,125,495 | 11/1978 | Griffin | 524/51 |
| 4,156,759 | 5/1979 | Hostettler | 521/102 |

(List continued on next page.)

FOREIGN PATENT DOCUMENTS

| | | |
|---|---|---|
| 0032802 | 7/1981 | European Pat. Off. . |
| 0282451A2 | 3/1988 | European Pat. Off. . |
| 0303460A1 | 8/1988 | European Pat. Off. . |
| 0304401A2 | 8/1988 | European Pat. Off. . |
| 0282451 | 9/1988 | European Pat. Off. . |
| 0298920 | 1/1989 | European Pat. Off. . |

(List continued on next page.)

OTHER PUBLICATIONS

Relationship Between Amylose Content and Extrusion-Expansion Properties of Corn Starches by R. Chinnaswamy et al. (1988).
Optimum Extrusion-Cooking Conditions for Maximum Expansion of Corn Starch by R. Chinnaswamy et al. (1988).
Expansion, Color and Shear Strength-Properties of Corn Starches Extrusion-Cooked with Urea and Salts by R. Chinnaswamy et al. (1988).
Effect of Extrusion-Cooking on Potato Starch Using a Twin Screw French Extruder by C. Mercier (1977).
Structure and Digestibility Alterations of Cereal Starches by Twin-Screw Extrusion Cooking by C. Mercier.
Modification of Carbohydrate Components by Extrusion-Cooking of Cereal Products by C. Mercier et al. (May/Jun., 1975).
Formation of Amylose-Lipid Complexes by Twin-Screw Extrusion Cooking of Manioc Starch by C. Mercier et al. (1980).
Structural Modification of Various Stqrches by Extru- (List continued on next page.)

Primary Examiner—Paul R. Michl
Assistant Examiner—Peter Szekely
Attorney, Agent, or Firm—Bryan Cave

[57] ABSTRACT

Expanded articles of biodegradable plastics are produced by the extrusion of a composition including starch, a polymer compatible with starch, in particular, an ethylene-acrylic acid copolymer and/or ethylene-vinyl alcohol copolymer, and an expanding agent. Preferably use is made of sodium bicarbonate as expanding agent in the presence of a polymeric acid.

17 Claims, No Drawings

U.S. PATENT DOCUMENTS

| | | | |
|---|---|---|---|
| 4,218,350 | 8/1980 | Griffin | 524/47 |
| 4,232,047 | 11/1980 | Sair et al. | 426/96 |
| 4,482,386 | 11/1984 | Wittwer et al. | 523/330 |
| 4,576,284 | 3/1986 | Wittwer et al. | 426/138 |
| 4,591,475 | 5/1986 | Tomka et al. | 264/328.14 |
| 4,655,840 | 4/1987 | Wittwer et al. | 106/126 |
| 4,673,438 | 6/1987 | Wittwer et al. | 106/126 |
| 4,738,724 | 4/1988 | Wittwer et al. | 106/213 |
| 4,790,881 | 12/1988 | Wittwer et al. | 524/37 |
| 4,863,655 | 9/1989 | Lacourse et al. | 106/122 |
| 4,900,361 | 2/1990 | Sachetto et al. | 524/47 |
| 5,035,930 | 7/1991 | Lacourse et al. | 521/84.1 |
| 5,043,196 | 8/1991 | Lacourse et al. | 521/84.1 |
| 5,095,054 | 3/1992 | Lay et al. | 524/47 |

FOREIGN PATENT DOCUMENTS

| | | |
|---|---|---|
| 0326517A1 | 1/1989 | European Pat. Off. |
| 0327505A2 | 1/1989 | European Pat. Off. |
| 0304401 | 2/1989 | European Pat. Off. |
| 0344118A2 | 5/1989 | European Pat. Off. |
| 0326517 | 8/1989 | European Pat. Off. |
| 0327505 | 8/1989 | European Pat. Off. |
| 0366256A2 | 9/1989 | European Pat. Off. |
| 0388924 | 9/1990 | European Pat. Off. |
| 0391853 | 10/1990 | European Pat. Off. |
| 0400532 | 12/1990 | European Pat. Off. |
| 0404723 | 12/1990 | European Pat. Off. |
| 0404727 | 12/1990 | European Pat. Off. |
| 0404728 | 12/1990 | European Pat. Off. |
| 0407350 | 1/1991 | European Pat. Off. |
| 0408501 | 1/1991 | European Pat. Off. |
| 0408502 | 1/1991 | European Pat. Off. |
| 0408503 | 1/1991 | European Pat. Off. |
| 0409781 | 1/1991 | European Pat. Off. |
| 0409782 | 1/1991 | European Pat. Off. |
| 0409783 | 1/1991 | European Pat. Off. |
| 0409788 | 1/1991 | European Pat. Off. |
| 0409789 | 1/1991 | European Pat. Off. |
| 53-19645 | 6/1978 | Japan. |
| WO83/02935 | 1/1983 | PCT Int'l Appl. |
| WO90/05161 | 10/1989 | PCT Int'l Appl. |
| WO90/10671 | 9/1990 | PCT Int'l Appl. |
| WO91/02023 | 2/1991 | PCT Int'l Appl. |
| WO91/02024 | 2/1991 | PCT Int'l Appl. |
| WO91/02025 | 2/1991 | PCT Int'l Appl. |
| 965349 | 7/1964 | United Kingdom. |
| 2187703A | 3/1987 | United Kingdom. |
| 2187703A | 3/1987 | United Kingdom. |
| 2190093 | 11/1987 | United Kingdom. |
| 2214920A | 2/1988 | United Kingdom. |
| 8802313 | 10/1988 | United Kingdom. |
| 2214919A | 9/1989 | United Kingdom. |

OTHER PUBLICATIONS sion Cooking with a Twin-Screw French Extruder by C. Mercier, et al. (Dec. 31, 1985).

Influence of Water-Insoluble Rye and Wheat Pentosan ... Changes in Various Starches (Sep., 1973).

Information disclosure Statement dated Dec. 29, 1988 with one-page PTO-1449 form.

Form PTO 892 dated Feb. 1989.

Information disclosure Statement dated May 1989 with one-page PTO-1449 form.

Information disclosure Statement dated Jan. 25, 1991 with four-page PTO-1449 form.

Information disclosure Statement dated Dec. 4, 1989.

Information disclosure Statement dated Jan. 23, 1991 with two-sheet PTO-1449 form.

Otey, F. H. et al., Ind. Eng. Chem. Res. 26(8):1659-63 (1987), "Starch-Based Blown Films".

EXPANDED ARTICLES OF BIODEGRADABLE PLASTICS MATERIALS AND A METHOD FOR THEIR PRODUCTION

This is a continuation of U.S. application Ser. No. 07/663,823, filed Mar. 27, 1991, now abandoned, which is incorporated by reference herein.

The present invention relates to expanded articles of biodegradable plastics material and to a method for producing such articles.

In recent years, many attempts have been made to produce biodegradable molded articles. Amongst the various materials proposed for producing such articles, the starches are certainly the most desirable since they are cheap, natural products which are very abundant in nature and are completely biodegradable.

Published European patent application EP-A-304,401 describes a method for the injection molding of capsules from destructurized starch. The articles produced by this process, however, have poor mechanical properties as well as being very soluble in water.

Unpublished Italian patent application No. 41002-A/89 and the corresponding international application PCT/EP90/00375 (as yet unpublished) describe a method which enables the production of molded articles with improved mechanical properties, in which the starch is mixed with an ethylene-acrylic acid copolymer, possibly with the addition of urea and/or ammonia in an extruder heated to a temperature of between 90° and 150° C. In this method, the water content of the extrusion is brought to less than 6% by weight, preferably less than 2% by weight, and the resulting composition is then extruded at a temperature of between 130° and 160° C.

EP-A-0 87 847 describes a process for preparing foamed gelatinized products made of starch, by heating granular or pulverized starch in an extruder press at a temperature of from 60° to 220° C. in the presence of 10-30% wt of water and a gas-forming or gas-generating expanding agent. The obtained foamed material has open pores and high water solubility, which make it suitable for use only as packing material for the protection of fragile articles or as a sound-absorbing or thermal insulating material or as a foodstuff.

The purpose of the present invention is to provide expanded articles which as well as being substantially biodegradable, are water insoluble and can be obtained by a conventional processing technique for thermoplastic materials such as extrusion or injection molding and have mechanical properties such as bending strength and elongation comparable to conventional foamed plastics.

In view of that purpose, a first subject of the invention consists of expanded articles characterized in that they are made of a material including starch and synthetic polymer selected from the group consisting of ethylene-acrylic acid and ethylene-vinyl alcohol copolymers and mixtures thereof, such articles having a closed pore structure and a density of from 0.1 to 0.3 g/cm$^3$.

The ethylene/vinyl alcohol copolymer which is used for the production of the expanded article has preferably an ethylene content of from 10 to 40% by weight (15–50% mol), more preferably of from 30 to 35% mol, with a melt flow index (230° C., 2.16 kg) of between 2 and 50, preferably between 6 and 20.

Further preferred features for the ethylene/vinyl alcohol copolymer are as follows:

| | |
|---|---|
| Intrinsic viscosity, (in DMSO at 30° C.) | 0.50–0.9 preferably 0.65–0.80 |
| Molecular weight distribution Mw/Mn (GPC in tetrahydrofurane) | 1.3–4 |
| Melting point temperature | 180° C. preferably 160–170° C. |
| Hydrolysis degree* | 90–99.9% |

*Basic hydrolysis and titration of the residual base with acid.

The preferred ethylene-acrylic acid copolymer (EAA) is that produced by copolymerization of a mixture including from 3 to 30%, preferably 20%, by weight of acrylic acid and, correspondingly, from 97 to 70%, preferably 80% by weight of ethylene.

The starch which is used comprises in general all the starches of a natural or vegetable origin, composed essentially of amylose and/or amylopectin. They can be extracted from various plants such as, for example, potatoes, rice, tapioca, maize and cereals such as rye, oats and wheat, maize starch is preferred. Chemically-modified starches can also be used as the starches.

The starch and the polymer may be used in a ratio of from 9:1 to 1:9 and preferably in a ratio of from 4:1 to 1:4, however the invention is particularly concerned with articles where the synthetic polymer constitutes from 20 to 40% wt referred to the total amount of starch and polymer.

The expanded articles according to the invention may be obtained with use of a physical expanding agent, such as carbon dioxide and n-pentane or of a chemical expanding agent, such as carbonate salts which are fed to the extrusion barrel together with the blend of starch and polymeric material.

According to a preferred method, use is made of sodium bicarbonate together with a polymeric acid compatible with starch.

A further subject of the invention is therefore constituted by a method for the production of expanded articles of biodegradable plastics material, characterized in that it includes the step of extruding a composition including starch and a synthetic polymer selected from the group consisting of ethylene-vinyl alcohol and ethylene-acrylic acid copolymers and mixtures thereof, in the presence of a polymeric acid and sodium bicarbonate as the expanding agent.

The use of sodium bicarbonate as a chemical expanding agent for the production of expanded articles of conventional synthetic plastic material is known; however, its use as the only expanding agent produces expanded plastics materials with rather poor properties in terms of expansion. In practice, therefore, the sodium bicarbonate is to advantage used only as a nucleating agent in conjunction with a physical expanding agent, as in the production of expanded polystyrene sheets, for example. Its use as an expanding agent for starch, as shown in the above mentioned EP-A-0 087 847, provides an open pore structure, which is unsuitable for the purposes of the present invention.

Within the scope of the method according to the invention, however, it has been found that in combination with the aforementioned polymeric acid, sodium bicarbonate has an effective expanding action which enables the production of expanded materials with densities down to 0.1 g/cm³ and generally between 0.1 g/cm³ and 0.3 g/cm³.

Without wishing to go into the physical-chemical mechanism of the expansion, it is thought possible that, in the method according to the invention, the expansion is not caused by the thermal decomposition of bicarbonate but takes place as a result of a chemical reaction between the carboxyl groups of the polymer used and the bicarbonate with the liberation of carbon dioxide and water.

The polymeric acid which is used, is preferably a polymer having lateral carboxyl groups such as polyacrylic acid, ethylene-acrylic acid copolymers (EAA) and ethylene-vinyl alcohol-acrylic acid copolymers. The same EAA copolymer which has been hereinabove defined may be used.

The extrusion temperature may range from 100° to 180° C. depending upon the choice of the copolymer which is mixed with starch.

In the embodiment where the copolymer which is mixed with starch and the polymeric acid are both an EAA copolymer, the extrusion temperature may be as low as 100° to 120° C. and preferably between 100° and 110° C., i.e. below the temperature of thermal decomposition of the bicarbonate. The fact that, according to this embodiment, the best results in terms of expansion were achieved when the extrusion was carried out in an extruder heated to a temperature below the temperature of thermal decomposition of bicarbonate, corroborates the hypothesis that the expansion is caused by the generation of carbon dioxide and water as a result of the chemical reaction between the carboxyl groups of the polymeric acid and the bicarbonate.

The quantity of sodium bicarbonate added is at least 0.3 of the equivalent weight of the bicarbonate for each equivalent weight of free carboxyl groups in the polymeric acid.

In order to facilitate the expansion, nucleating agents, such as, for example, silicas may be included in the polymeric composition.

In order to further reduce the density of the foamed (extruded) articles, when desirable, it is advantageous to add to the polymeric composition within the extruder, as a filler, a pyrolized foamed starch, in granular form, as obtainable from the process of the above mentioned EP-A-0 087 847 or hollow glass microspheres in a quantity up to 30% wt with respect to the overall composition and preferably between 5 and 20% wt.

The extrusion process is carried out in such a way that the starch is substantially destructured and the starch phase interpenetrates the copolymer phase.

In order to encourage the destructuring of the starch, which has its own intrinsic water content generally of between 10 and 13% wt, water may be added up to a quantity of approximately 25% by weight of the weight of the dry starch. The water content of the final product however, must be less than 6% and preferably between 0 and 2% by weight.

The composition which is extruded may also include urea up to 30% of the total composition and highboiling plasticizers, such as glycerine, ethyl glycol and the like. Further additives may be considered in dependence on the desired characteristics and applications of the expanded material to be produced. The additives may include polymeric materials such as polyvinyl alcohol, conventional additives used in the preparation of plastics materials, such as UV stabilizers, flame-proofing agents, fungicides, herbicides, anti-oxidants, fertilizers, opacifying agents, antiblocking agents, lubricants and plasticizers.

Expanded articles can also be produced by the addition of sodium bicarbonate to pellets of starch and a compatible polymer produced beforehand by the method described in PCT/EP90/00375 the contents of which should be considered as incorporated in the present specification as a reference.

EXAMPLE 1

A composition was prepared, containing:
36% by weight of the starch GLOBE 3401 CERESTAR with a water content of 11%;
36% by weight of the Dow Chemical copolymer EAA 5981 with a 20% acrylic acid content;
6% by weight of water;
14% of urea, and
8% by weight of sodium bicarbonate.

The products were premixed and then supplied to an extruder for the extrusion of expanded tubing. The temperature in the extruder was kept within the range of between 100° and 110° C.

The expanded product had a density of approximately 0.15 g/cm³ with closed-cell dimensions of between 0.3 mm and 2 mm and elongation higher than 10%

EXAMPLE 2

A composition was prepared containing:
36% wt of the starch GLOBE 3401 CERESTAR
18% wt of the EAA copolymer Dow 5981
6% wt of water
9% wt of glycerine
5% wt of urea
18% ethylene-vinyl alcohol (ethylene comonomer content 30% mol)
8% wt sodium bicarbonate The composition was mixed in the extruder barrel at 170° C. and injection moulded to provide slab specimen having dimensions 3×120×20 mm.

The expanded product had a density of about 0.3 g/cm³ with closed-cell dimensions between 0.5 and 2.5 mm.

We claim:

1. Expanded articles of biodegradable plastics material comprising a material including starch and a synthetic polymer selected from the group consisting of ethylene-vinyl alcohol, ethylene-acrylic acid, and mixtures thereof, said articles having a closed pore structure and a density of from 0.1 to 0.3 g/cm³.

2. Expanded articles according to claim 1, wherein the ethylene-vinyl alcohol copolymer has an ethylene content of from 10 to 40% by weight and a melt flow index of from 6 to 20.

3. Expanded articles according to claim 1, wherein the ethylene-acrylic acid copolymer is produced by the copolymerization of a mixture including from 3 to 30% by weight of acrylic acid and from 97 to 70% of ethylene.

4. Expanded articles according to claim 1, wherein the starch and the copolymer are in a weight ratio of from 1:4 to 4:1.

5. Expanded articles according to claim 1, further including urea and/or a high-boiling plasticizer.

6. Expanded articles according to claim 1, further including a polymeric acid selected from the group consisting of polyacrylic acid, and ethylene-acrylic acid-vinyl alcohol copolymer.

7. Expanded articles according to claim 1, including a filler consisting of granular pyrolized foamed starch or hollow glass microspheres.

8. A method for the production of expanded articles of biodegradable plastics material, comprising the step of extruding a composition including starch and a synthetic polymer selected from the group consisting of ethylene-vinyl alcohol and ethylene-acrylic acid in the presence of a polymeric acid and sodium bicarbonate as the expanding agent.

9. A method according to claim 8, wherein the synthetic polymer is ethylene-vinyl alcohol and the polymeric acid is selected from the group consisting of polyacrylic acid, ethylene-acrylic acid, and ethylene-acrylic acid-vinyl alcohol copolymers.

10. A method according to claim 8 in which the copolymer is produced by a copolymerization of a mixture including from 3 to 30% by weight of acrylic acid and from 97 to 70% of ethylene.

11. A method according to claim 8 wherein the ethylene vinyl alcohol copolymer has an ethylene content of from 10 to 40% by weight and a melt flow index of from 6 to 20.

12. A method according to claim 8 wherein the quantity of sodium bicarbonate added is equal to at least 0.3 equivalents of the bicarbonate for each equivalent weight of free carboxyl groups in the polymeric acid.

13. A method according to claim 8, in which the starch and the copolymer are in a ratio of from 4:1 to 1:4.

14. A method according to claim 8, in which the composition includes a quantity of urea of up to 30% by weight of the total weight of the composition and/or a high-boiling plasticizer.

15. A method according to claim 8, wherein the synthetic polymer is ethylene-acrylic acid and the polymeric acid is the ethylene-acrylic acid synthetic polymer and wherein the composition is mixed in an extruder barrel heated to a temperature of between 100° C. and the temperature of thermal decomposition of the bicarbonate.

16. A method according to claim 8, in which the composition includes a quantity of water of from 10 to 25% by weight of the weight of the dry starch.

17. A method according to claim 8, wherein the synthetic polymer is ethylene-acrylic acid and the polymeric acid is selected from the group consisting of polyacrylic acid, the ethylene-acrylic acid synthetic polymer and ethylene-acrylic acid-vinyl alcohol copolymers.

* * * * *

UNITED STATES PATENT AND TRADEMARK OFFICE
CERTIFICATE OF CORRECTION

PATENT NO. : 5,288,765
DATED : Feb. 22, 1994
INVENTOR(S) : Catia Bastioli, et al It is certified that error appears in the above-indentified patent and that said Letters Patent is hereby corrected as shown below:

Title page, item [73] change the assignee from "Spherilene S.r.l." to

--Novamont, S.p.A.--

Signed and Sealed this

Fifth Day of July, 1994

Attest:

BRUCE LEHMAN

Attesting Officer

Commissioner of Patents and Trademarks